United States Patent
Adler et al.

(10) Patent No.: US 11,807,203 B2
(45) Date of Patent: Nov. 7, 2023

(54) REDUNDANT BRAKE SYSTEM FOR AN AUTONOMOUSLY DRIVEN VEHICLE

(71) Applicant: Knorr-Bremse Systeme Fuer Nutzfahrzeuge GmbH, Munich (DE)

(72) Inventors: Tamas Adler, Erd (HU); Huba Nemeth, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 345 days.

(21) Appl. No.: 17/274,734

(22) PCT Filed: Sep. 10, 2019

(86) PCT No.: PCT/EP2019/074038
§ 371 (c)(1),
(2) Date: Mar. 9, 2021

(87) PCT Pub. No.: WO2020/058028
PCT Pub. Date: Mar. 26, 2020

(65) Prior Publication Data
US 2021/0347348 A1  Nov. 11, 2021

(30) Foreign Application Priority Data
Sep. 18, 2018  (EP) .................................... 18195249

(51) Int. Cl.
*B60T 13/68* (2006.01)
*B60T 13/66* (2006.01)

(52) U.S. Cl.
CPC .......... *B60T 13/683* (2013.01); *B60T 13/662* (2013.01); *B60T 2270/402* (2013.01)

(58) Field of Classification Search
CPC . B60T 13/683; B60T 2270/402; B60T 13/662
See application file for complete search history.

(56) References Cited

U.S. PATENT DOCUMENTS

| 7,866,761 | B2 * | 1/2011 | Gerum | .................... B60T 13/66 303/127 |
| 2005/0067887 | A1 | 3/2005 | Nilsson et al. | |
| 2005/0275281 | A1 | 12/2005 | Prescott | |
| 2007/0170774 | A1 | 7/2007 | Gerum et al. | |

(Continued)

FOREIGN PATENT DOCUMENTS

| CN | 1922065 A | 2/2007 |
| CN | 106660534 A | 5/2017 |

(Continued)

OTHER PUBLICATIONS

WO 2020/057964 published Mar. 26, 2020 to Adler et al.*

(Continued)

*Primary Examiner* — Pamela Rodriguez
(74) *Attorney, Agent, or Firm* — NORTON ROSE FULBRIGHT US LLP; Gerard Messina

(57) ABSTRACT

A redundant brake system (1) for an autonomously driven vehicle is provided. The redundant brake system (1) comprises an electro-pneumatic service brake system, wherein the redundant brake system (1) is provided with at least three control circuits for controlling the electro-pneumatic service brake system.

11 Claims, 1 Drawing Sheet

(56) References Cited

U.S. PATENT DOCUMENTS

| | | | |
|---|---|---|---|
| 2008/0021623 A1 | 1/2008 | Frey et al. | |
| 2008/0296106 A1 | 12/2008 | Nilsson | |
| 2011/0144855 A1* | 6/2011 | Herges | B60T 13/683 |
| | | | 701/29.1 |
| 2012/0109470 A1 | 5/2012 | Amtsfeld et al. | |
| 2015/0377962 A1* | 12/2015 | Daveau | G06F 11/267 |
| | | | 714/729 |
| 2018/0001879 A1 | 1/2018 | Witte | |

FOREIGN PATENT DOCUMENTS

| | | |
|---|---|---|
| CN | 106662614 A | 5/2017 |
| CN | 107000726 A | 8/2017 |
| CN | 107206995 A | 9/2017 |
| CN | 107438544 A | 12/2017 |
| DE | 102015011296 A1 | 3/2017 |
| EP | 1541437 A2 | 6/2005 |
| GB | 2448007 A | 10/2008 |
| WO | 2009152982 A2 | 12/2009 |

OTHER PUBLICATIONS

British Patent No. GB 2583533 published Nov. 4, 2020 to Fry et al.*
Chinese Patent No. CN 112055675 published Dec. 8, 2020 to Farres et al.*
International Search Report for PCT/EP2019/074038 dated Nov. 25, 2019.

* cited by examiner

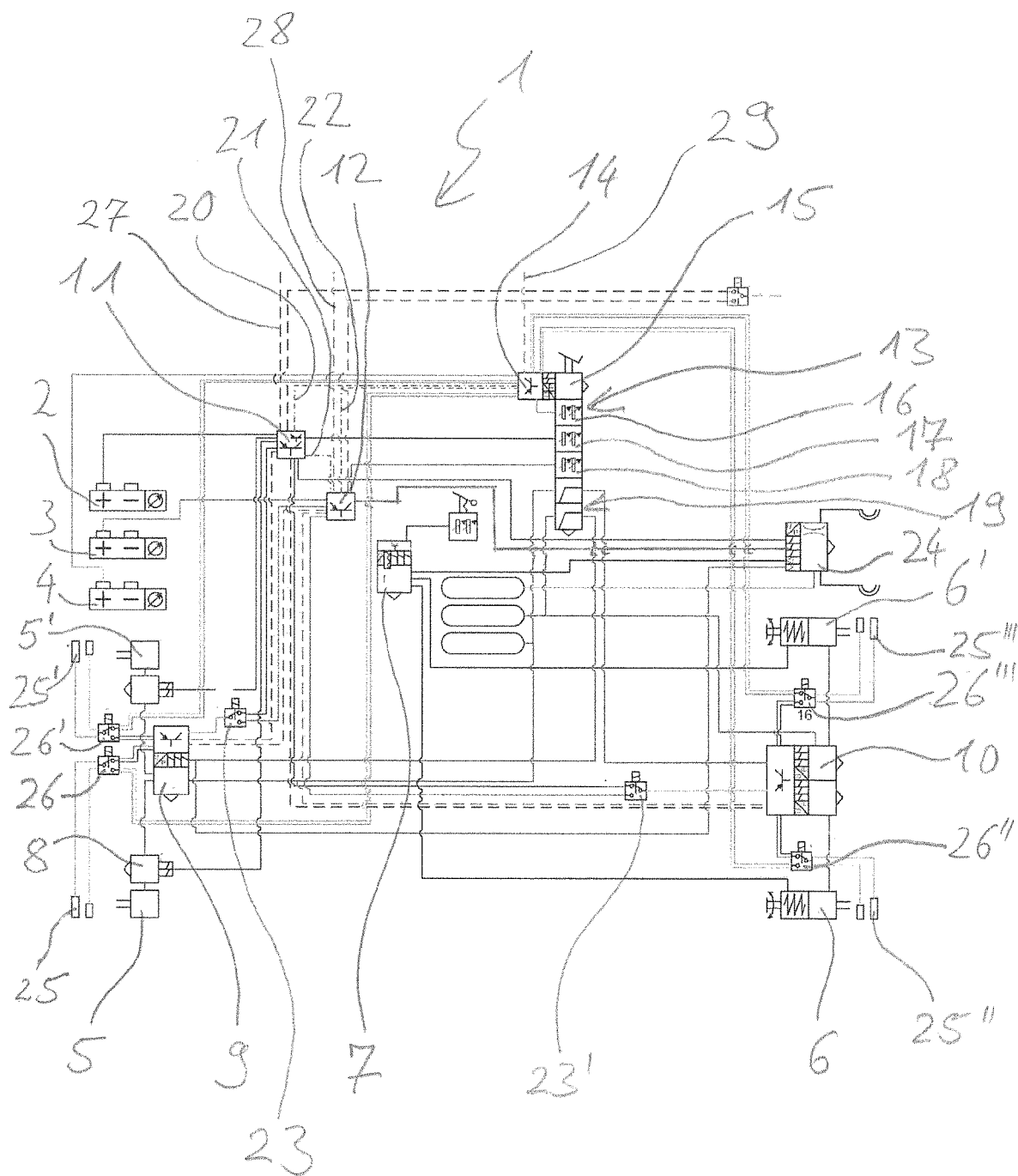

REDUNDANT BRAKE SYSTEM FOR AN AUTONOMOUSLY DRIVEN VEHICLE

FIELD OF THE INVENTION

The invention relates to a redundant brake system for an autonomously driven vehicle, in particular to a redundant brake system for an autonomously driven transport vehicle, as e.g. a truck and trailer combination.

BACKGROUND INFORMATION

The autonomous operation of transport vehicles is a new field of innovations. More sophisticated functions require special hardware infrastructure.

Until now, in particular, commercial vehicle systems require the presence and attention of the driver. However, prospectively, a driver will be less involved into a driving control task of the vehicle. Therefore, autonomous systems are going to take over more significant driven functions which, however, requires increased reliability levels and consequently different types of system redundancies.

Nowadays, commercial vehicles use electro-pneumatic or by-wire brake systems in which an electronic part of a control is realized as a single circuit control. In case of malfunction of the control electronics, nevertheless, the driver is able to control the pneumatic part of the brake system by foot because a two circuit pneumatic backup system is still available.

However, in case of highly automated vehicles in which the driver is not anymore in the control loop or, is even not available or present in the vehicle, the above brake system would be unsatisfactory since there is no means which would substitute the brake control of the driver in case of malfunction of the single electronic control circuit.

SUMMARY OF THE INVENTION

Therefore, an object underlying the invention is to provide a redundant brake system which enhances reliability in case of an autonomous operation of a vehicle.

The object may be achieved by a redundant brake system according to claim 1. Advantageous further developments are included in the dependent claims.

According to an aspect of the invention, a redundant brake system for an autonomously driven vehicle comprises an electro-pneumatic service brake system, wherein the redundant brake system is provided with at least three control circuits for controlling the electro-pneumatic service brake system.

By providing at least three control circuits, a reliability against malfunction is enhanced since in case of a single failure, the vehicle can be operated further on in a safe manner by still having a redundant system.

In an advantageous implementation of the redundant brake system, the at least three control circuits are electrically supplied by at least three power sources.

The reliability of the redundant brake system is further enhanced since the redundant brake system still has a redundant configuration even when a quite probable failure of a battery occurs.

In a further advantageous implementation of the redundant brake system, the redundant brake system comprises a front axle brake actuator and a rear axle brake actuator, a front axle control valve for controlling the front axle brake actuator, a front axle pressure modulator for providing an appropriate front axle brake pressure to the front axle control valve, a rear axle pressure modulator for providing an appropriate rear axle brake pressure and for controlling the rear axle brake actuator, and at least a first control circuit comprising a first electronic brake control unit, a second control circuit comprising a second electronic brake control unit, and a third control circuit comprising an intelligent foot brake module, wherein the intelligent foot brake module comprises a control unit, a pressure control and modulation unit for actuating an adjustment of the intelligent foot brake module according to a brake pedal position for pre-setting a brake force, brake pedal position sensors configured to respectively control provide a driver's brake demand for the control units of the at least three control circuits, a pneumatic valve portion configured to pneumatically control the front axle pressure modulator and the rear axle pressure modulator, and wherein the redundant brake system is configured to control the front axle pressure modulator and the rear axle pressure modulator alternatively by the intelligent foot brake module in a pneumatic manner, by the first electronic brake control unit, or by the second electronic brake control unit, wherein power supply switches configured to switch a power supply of the front axle pressure modulator and of the rear axle pressure modulator between the first control circuit and the second control circuit are provided.

By this configuration, two control circuits electrically controlling the appropriate brake pressures of the front axle brake and of the rear axle break and one control circuit pneumatically controlling the appropriate brake pressures of the front axle brake and of the rear axle break are provided. Therefore, due to a redundant provision of the electrically controlling control circuits and an additional provision of the pneumatically controlling control circuit functioning based on another physical principle, the reliability is further enhanced.

In a further advantageous implementation of the redundant brake system, it comprises a trailer control module configured to control a trailer brake force of a trailer brake system connected to the trailer control module, wherein the trailer brake force is configured to be controlled alternatively by the first electronic brake control unit, by the second electronic brake control unit, or by the intelligent foot brake module.

Due to this configuration, also the redundant brake system of the trailer can be controlled in a redundant manner, moreover, by providing different physical principles of the control circuits and, therefore, the reliability of the entire redundant brake system is enhanced.

In a further advantageous implementation of the redundant brake system, the redundant brake system further comprises wheel-end sensors and signal switching devices, wherein the signal switching devices are configured to respectively switch a communication between the wheel-end sensors and a respective one of the rear axle pressure modulator and front axle pressure modulator, or between the wheel-end sensors and the intelligent foot brake module.

By the provision of the signal switching devices, in normal operation, the signals of the wheel-end sensors, e.g. wheel speed, wear, etc., can be processed in the pressure modulators for providing an appropriate brake pressure, and, in case of a failure of the first and second control circuit, wherein the pressure modulators do not work, the signals are used by the intelligent foot brake module. Therefore the signals of the sensors can be processed in any condition of the redundant brake system.

In a further implementation of the redundant brake system, in case of manual operation of the intelligent foot brake module, the redundant brake system is configured to operate all of the at least three control circuits.

This configuration enables a manual operation of the vehicle while the safety standard is not deteriorated.

In a further implementation of the redundant brake system, the at least three control circuits are configured to be actuated via independent circuit-external communication lines.

Because of the actuation of the control circuits via independent circuit-external lines, e.g. a CAN bus, a failure of one of the control circuits does not prevent a transfer of the braking task to another one of the control circuits.

In a further implementation of the redundant brake system, the brake control units are pairwise interlinked with each other by interlink communication lines.

Due to pairwise interlinking the brake control units, a failure of one of the control units does not disturb a transfer of the braking task of another one of the control units.

In the following, the invention is elucidated by means of an embodiment referring to the attached drawing.

BRIEF DESCRIPTION OF THE DRAWING

FIG. 1 shows a brake system architecture of an embodiment of a redundant brake system according to the invention.

DETAILED DESCRIPTION

FIG. 1 shows a brake system architecture of an embodiment of a redundant brake system 1 according to the invention.

The redundant brake system 1 includes an electro-pneumatic service brake system, wherein the redundant brake system 1 is provided with three control circuits for controlling the electro-pneumatic service brake system. In particular, the redundant brake system 1 comprises a redundant Electro-Pneumatic Module (rEPM) comprising two electronic control circuits and an intelligent Foot Brake Module (iFBM) comprising a pneumatic control circuit. In alternative embodiments, more than three control circuits can be provided.

The three control circuits are electrically supplied by at least three power sources. A first control circuit is supplied by a first battery 2, a second control circuit is supplied by a second battery 3, and a third control circuit is supplied by a third battery 4. In an alternative embodiment, having more than three control circuits, not each of the control circuits has to be supplied by an own battery but at total quantity of batteries has to be sufficient. Moreover, alternatively, other power supplies than a battery, e.g., generators, are possible.

In this embodiment, the redundant brake system 1 further comprises two front axle brake actuators 5, 5' and two rear axle brake actuators 6, 6'. The front axle brake actuators 5, 5' are respectively formed by a service brake chamber and the rear axle actuators 6, 6' are respectively formed by a spring brake combi cylinder, however, brake actuators of another type are possible. Further, in this embodiment, the redundant brake system 1 is provided with an electro-pneumatic park brake system, provided with an electro-pneumatic park brake controller 7, which also uses the spring brake combi cylinder. In alternative embodiments, however, the electro-pneumatic park brake system can be omitted. Furthermore, the redundant brake system 1 comprises two front axle control valves 8, 8' for controlling the front axle brake actuators 5, 5', a front axle pressure modulator 9 for providing an appropriate front axle brake pressure to the front axle control valves 8, 8', and a rear axle pressure modulator 10 for providing an appropriate rear axle brake pressure and for controlling the rear axle brake actuators 6, 6'. The quantity of these components in this embodiment is indicated for a vehicle, e.g. a tractor unit, which is provided with one front axle and one rear axle. In alternative embodiments, the quantity of these components depends on the quantity and configuration of the axles.

Furthermore, the first control circuit comprises a first electronic brake control unit 11, the second control circuit comprises a second electronic brake control unit 12, and the third control circuit comprising an intelligent foot brake module 13.

The intelligent foot brake module 13 comprises a foot brake control unit 14 and a pressure control and modulation unit 15 configured to actuate an adjustment of the intelligent foot brake module 13 corresponding to a brake pedal position for pre-setting a brake force. By the pressure control and modulation unit 15, the intelligent foot brake module 13 can be actuated similar to a pneumatic actuator included in the pressure control and modulation unit 15. The driven pressure by the pressure control and modulation unit 15 is proportional to a pedal stroke.

Further, the intelligent foot brake module 13 comprises brake pedal position sensors 16, 17, 18 configured to respectively provide a driver's brake demand for the control units 11, 12, 14 of the control circuits, and a pneumatic valve portion 19 configured to pneumatically control the front axle pressure modulator 9 and the rear axle pressure modulator 10.

The redundant brake system 1 is configured to control the front axle pressure modulator 9 and the rear axle pressure modulator 10 alternatively by the intelligent foot brake module 13 in a pneumatic manner, by the first electronic brake control unit 11 in an electronic manner, or by the second electronic brake control unit 12 in an electronic manner, wherein power supply switches 23, 23' configured to respectively switch a power supply of the front axle pressure modulator 9 and of the rear axle pressure modulator 10 between the first control circuit and the second control circuit are provided.

In alternative embodiments, the redundant brake system 1 can be configured in another manner and components provided in this embodiment can be omitted and other components can be included as appropriate.

Furthermore, the redundant brake system 1 comprises a trailer control module 24 configured to control a trailer brake force of a trailer brake system connected to the trailer control module 24, wherein, depending of a condition of the first control circuit, the trailer brake force is configured to be controlled alternatively by the first electronic brake control unit 11, by the second electronic brake control unit 12, or by the intelligent foot brake module 13. In an alternative embodiment, e.g. a single lorry without the option to attach a trailer, the trailer control module 24 is omitted.

Moreover, the redundant brake system 1 comprises wheel-end sensors 25, 25', 25", 25''', and signal switching devices 26, 26', 26", 26'''. The signal switching devices 26, 26', 26", 26" are configured to switch a communication between the wheel-end sensors 25, 25', 25", 25"' and a respective one of the rear axle pressure modulator 9 and front axle pressure modulator 10, or between the wheel-end sensors 25, 25', 25", 25" and the intelligent foot brake module 13. During normal operation, the signal switching devices 26, 26', 26", 26" provide a communication between the signal switching devices 26, 26', 26", 26" and the respective one of the rear axle pressure modulator 9 and front axle pressure modulator 10, however, in case of malfunction of the first and second control circuit, the signal switching devices 26, 26', 26", 26''' provide a communication between the wheel-end sensors 25, 25', 25", 25''' and the intelligent foot brake module 13.

The three control circuits are configured to be actuated via independent circuit-external communication lines 27, 28, 29. In an alternative embodiment, the control circuits can be actuated via communication lines included in the control circuits. The brake control units 11, 12, 14 are pairwise interlinked with each other by interlink communication lines 20, 21, 22. In an alternative embodiment, the brake control units can also be serially interlinked by, e.g., a bus system.

In use, in normal operation without any malfunction of anyone of the control circuits, the redundant brake system 1 operates by using the first control circuit including the first brake control unit 11 which controls the two front axle control valves 8, 8', and via a specific switching position of the power supply switches 23, 23', the front axle pressure modulator 9 and rear axle pressure modulator 10. Furthermore, the brake system of the trailer is controlled via the trailer control module 24.

In case of a failure of the first control circuit, the second circuit of the redundant electro-pneumatic module continues the control of the redundant brake system 1. Thereby, via a specific switching position of the power supply switches 23, 23', merely the front axle pressure modulator 9 and rear axle pressure modulator 10 are controlled.

In case of a malfunction of the redundant electro-pneumatic module, i.e. of the first control circuit and of the second control circuit including their batteries 2, 3, 4, the intelligent foot brake module, i.e. the third control circuit, takes over the task of controlling the redundant brake system 1.

Then, in case of braking, the driven pressure of the pressure modulator unit 15 of the intelligent foot brake module 13 generates an artificial pedal stroke. Further operation is similar to a conventional foot brake module. The driven pressure by the intelligent foot brake module 13 is actuating backup ports of the pressure modulators 9, 10. Because, due to the malfunction of the first and the second control circuit, the pressure modulators 9, 10 are in an unpowered state, the pressure backup ports of the pressure modulators 9, 10 are connected to the pneumatic output of the intelligent foot brake module 13 and, therefore, the intelligent foot brake module 13 can actuate the brake actuators 5, 5' via the pressure modulators 9, 10.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations combinations or equivalents that fall within the scope of the present invention.

THE REFERENCE SIGN LIST IS AS FOLLOWS

1 redundant brake system
2 first battery
3 second battery
4 third battery
5, 5' front axle brake actuator
6, 6' rear axle brake actuator
7 electro-pneumatic park brake controller
8, 8' front axle control valve
9 front axle pressure modulator
10 rear axle pressure modulator
11 first electronic brake control unit
12 second electronic brake control unit
13 intelligent foot brake module
14 foot brake control unit
15 pressure control and modulation unit
16, 17, 18 control outputs
19 pneumatic valve portion
20, 21, 22 interlink communication lines
23, 23' power supply switch
24 trailer control module
25, 25',25", 25''' wheel-end sensors
26, 26', 26", 26''' signal switching device
27, 28, 29 communication lines

The invention claimed is:

1. A redundant brake system for an autonomously driven vehicle, comprising:
   an electro-pneumatic service brake system, wherein the redundant brake system includes at least three control circuits to control the electro-pneumatic service brake system, wherein the at least three control circuits include:
   a first control circuit including a first electronic brake control unit,
   a second control circuit including a second electronic brake control unit, and
   a third control circuit including an intelligent foot brake module;
   wherein the intelligent foot brake module includes:
     a control unit,
     a pressure control and modulation unit to actuate an adjustment of the intelligent foot brake module according to a brake pedal position for pre-setting a brake force,
     brake pedal position sensors to respectively provide a driver's brake demand for the control units of the at least three control circuits, and
     a pneumatic valve portion to pneumatically control a front axle pressure modulator and a rear axle pressure modulator,
   wherein the redundant brake system is configured to control the front axle pressure modulator and the rear axle pressure modulator.

2. The redundant brake system of claim 1, wherein the at least three control circuits are electrically supplied by at least three power sources.

3. The redundant brake system of claim 1, wherein the redundant brake system includes:
   a front axle brake actuator and a rear axle brake actuator;
   a front axle control valve to control the front axle brake actuator;
   the front axle pressure modulator to provide an appropriate front axle brake pressure to the front axle control valve; and
   the rear axle pressure modulator to provide an appropriate rear axle brake pressure and to control the rear axle brake actuator.

4. The redundant brake system of claim 1, wherein the front axle pressure modulator and the rear axle pressure modulator are controlled alternatively by the intelligent foot brake module in a pneumatic manner, or by the first electronic brake control unit in an electronic manner, or by the second electronic brake control unit in an electronic manner.

5. The redundant brake system of claim 4, wherein power supply switches are configured to respectively switch a power supply of the front axle pressure modulator and of the rear axle pressure modulator between the first control circuit and the second control circuit.

6. A redundant brake system for an autonomously driven vehicle, comprising:
    an electro-pneumatic service brake system, wherein the redundant brake system includes at least three control circuits to control the electro-pneumatic service brake system, wherein the redundant brake system includes:
    a front axle brake actuator and a rear axle brake actuator;
    a front axle control valve to control the front axle brake actuator;
    a front axle pressure modulator to provide an appropriate front axle brake pressure to the front axle control valve;
    a rear axle pressure modulator to provide an appropriate rear axle brake pressure and to control the rear axle brake actuator; and
    at least the following:
        a first control circuit including a first electronic brake control unit,
        a second control circuit including a second electronic brake control unit, and
        a third control circuit including an intelligent foot brake module, wherein the intelligent foot brake module includes:
            a control unit,
            a pressure control and modulation unit to actuate an adjustment of the intelligent foot brake module according to a brake pedal position for pre-setting a brake force,
            brake pedal position sensors to respectively provide a driver's brake demand for the control units of the at least three control circuits,
            a pneumatic valve portion to pneumatically control the front axle pressure modulator and the rear axle pressure modulator;
    wherein the redundant brake system is configured to control the front axle pressure modulator and the rear axle pressure modulator alternatively by the intelligent foot brake module in a pneumatic manner, or by the first electronic brake control unit in an electronic manner, or by the second electronic brake control unit in an electronic manner, and
    wherein power supply switches are configured to respectively switch a power supply of the front axle pressure modulator and of the rear axle pressure modulator between the first control circuit and the second control circuit.

7. The redundant brake system of claim 6, further comprising:
    a trailer control module to control a trailer brake force of a trailer brake system connected to the trailer control module, wherein the trailer brake force is configured to be controlled alternatively by the first electronic brake control unit, by the second electronic brake control unit, or by the intelligent foot brake module.

8. The redundant brake system of claim 6, further comprising:
    wheel-end sensors; and
    signal switching devices;
    wherein the signal switching devices are configured to respectively switch a communication between the wheel-end sensors and a respective one of the front axle pressure modulator and the rear axle pressure modulator, or between the wheel-end sensors and the intelligent foot brake module.

9. The redundant brake system of claim 6, wherein for manual operation of the intelligent foot brake module, the redundant brake system is configured to operate all of the at least three control circuits.

10. The redundant brake system of claim 6, wherein the at least three control circuits are configured to be actuated via independent circuit-external communication lines.

11. The redundant brake system of claim 6, wherein the brake control units are pairwise interlinked with each other by interlink communication lines.

* * * * *